(12) United States Patent
Fornes

(10) Patent No.: US 6,615,768 B2
(45) Date of Patent: Sep. 9, 2003

(54) HEAD GATE ELEMENT COMPRISING A SOLID CONTROL BAR PROVIDED WITH A NOTCH FOR LOCKING THE MOVABLE BAR

(76) Inventor: Josë Fornes, 32 rue de Richelieu 86200, Loudun (FR)

( * ) Notice: Subject to any disclaimer, the term of this patent is extended or adjusted under 35 U.S.C. 154(b) by 0 days.

(21) Appl. No.: 10/123,053

(22) Filed: Apr. 12, 2002

(65) Prior Publication Data

US 2003/0000481 A1 Jan. 2, 2003

(30) Foreign Application Priority Data

May 2, 2001 (FR) .............................. 01 05873

(51) Int. Cl.[7] .......................... A01K 1/00; A01K 15/04
(52) U.S. Cl. ...................... 119/524; 119/741
(58) Field of Search ........................ 119/524, 738, 119/739, 741, 745, 747

(56) References Cited

U.S. PATENT DOCUMENTS

| | | | | |
|---|---|---|---|---|
| 1,835,923 A | * | 12/1931 | Babson | ........................ 119/741 |
| 4,185,592 A | * | 1/1980 | Albers, Sr. | .................... 119/741 |
| 5,309,869 A | * | 5/1994 | Albers, Jr. | .................... 119/741 |
| 5,715,775 A | * | 2/1998 | Anderson | .................... 119/739 |
| 5,878,697 A | * | 3/1999 | Hatfield | ....................... 119/741 |
| 6,082,306 A | * | 7/2000 | Hatfield | ....................... 119/524 |

* cited by examiner

Primary Examiner—Charles T. Jordan
Assistant Examiner—Elizabeth Shaw
(74) Attorney, Agent, or Firm—Nawrocki, Rooney & Sivertson, P.A.

(57) ABSTRACT

The head gate element comprises a frame (1), a movable bar (10) able to adopt three positions—open (O), closed (F) or released (D)—and receiving a locking fork joint (11), and a control bar (13) intended for locking the movable bar in the closed position.

The control bar (13) is solid and comprises a transverse notch arranged so that a slide, carried by the locking fork joint (11), can fit therein when the movable bar (10) and the control bar (13) are in the closed position (F).

19 Claims, 5 Drawing Sheets

ART ANTERIEUR

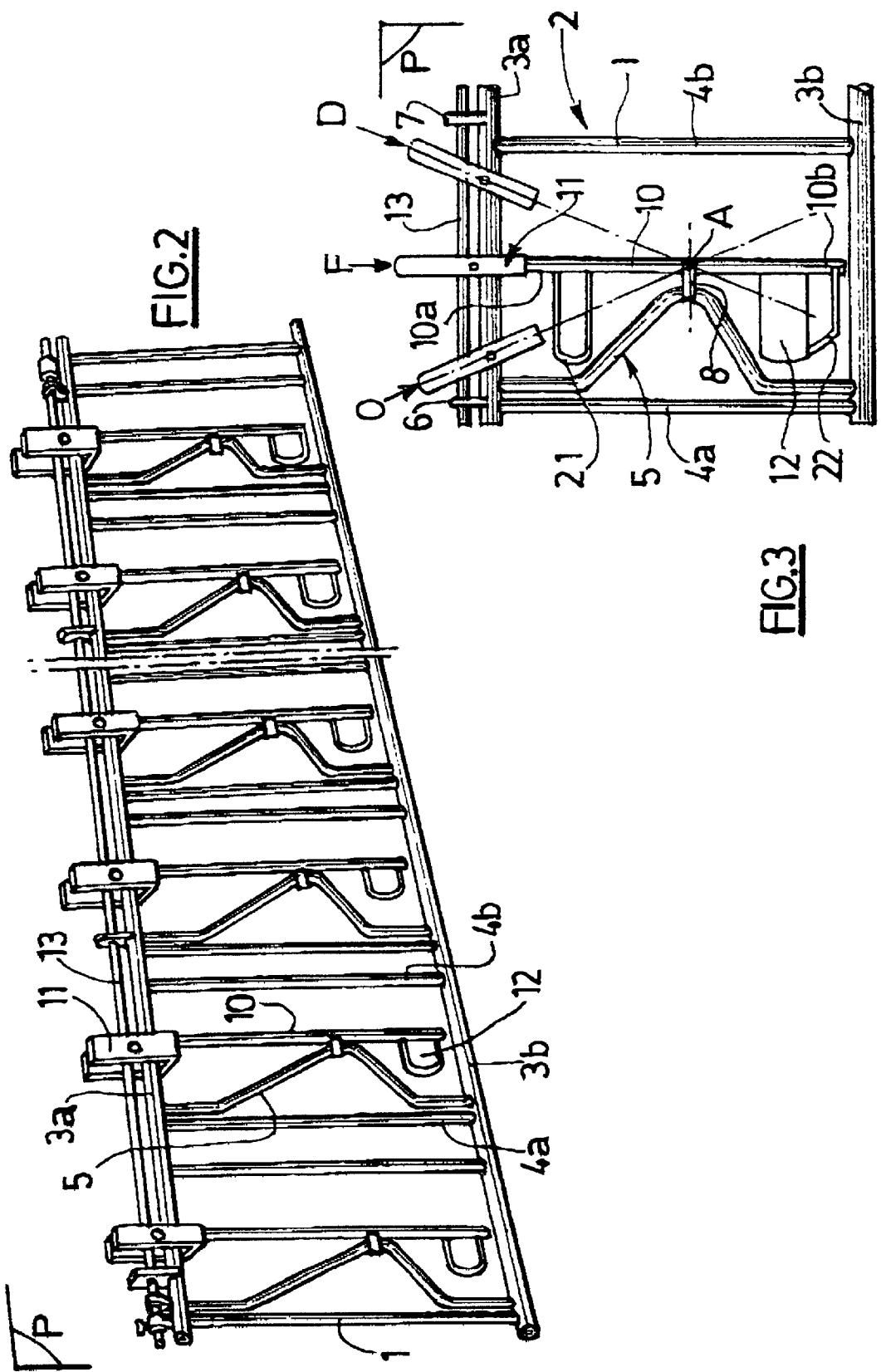

HEAD GATE ELEMENT COMPRISING A SOLID CONTROL BAR PROVIDED WITH A NOTCH FOR LOCKING THE MOVABLE BAR

The invention relates to a head gate of the type comprising at least one tubular structural element and extending in a main plane.

The head gate is a special gate constituting a barrier making it possible to hold farm animals in position, limiting their movements by holding their neck between two parallel vertical bars.

Each structural element comprises a frame in which a substantially rectilinear movable bar is mounted so as to pivot, substantially half-way along its length, about an axis perpendicular to the main plane.

This movable bar can consequently adopt three positions:
- an open position providing a space between substantially the top half of the movable bar and the frame, thus enabling the animal to pass its head through the head gate element;
- a closed position in which the movable bar is substantially vertical and parallel to an element of the frame, preventing the animal from withdrawing its head from the head gate element;
- a release position providing a space between substantially the bottom half of the movable bar and the frame, thus enabling the animal, for example in the event of falling, to withdraw its head from the head gate element through the bottom.

Each head gate element makes it possible to accept one animal, the head gate being formed by the assembly, in the same plane, of as many elements as there are animals.

In the prior art, the head gate elements comprise means of locking the aforementioned movable bar.

By way of example and as described in the patent FR 2 750 292 of the present applicant, FIG. 1 is a partial view of a head gate element showing one of these devices for locking the movable bar.

These locking means usually comprise a hollow control bar 113 mounted on a top part 103 of the frame 101 and a locking fork joint 111 fixed at the top end 110a of the movable bar 110, the locking fork joint 111 coming to straddle the control bar 113.

The control bar 113 is able to move in rotation about its longitudinal axis and has, over its length, projections 121, 122, 123 intended to cooperate with a slide 115 carried by the locking fork joint 111.

The locking fork joint 111 comprises two substantially parallel walls 111a, 111b, extending in the longitudinal direction of the movable bar 110, in which facing oblong holes 130a, 130b are formed, also extending in the longitudinal direction of the movable bar 110.

The slide 115, extending between the walls 111a, 111b of the locking fork joint 111 and being guided in translation in the oblong holes 130a, 130b, cooperates under the effect of its own weight with the projections 121, 122, 123 on the control bar 113 in order to lock the movable bar 110 in its closed position.

The head gate described in the document FR 2 750 292 does not give complete satisfaction.

This is because manufacturing the control bar 113 comprising projections 121, 122, 123 is complex and expensive.

These projections are generally pieces welded onto the control bar 113, which consequently poses problems of positioning the pieces during the welding, and problems of deformation due to the internal stresses created in the material by the welding.

In addition, the document EP-A-1 040 753 describes a head gate comprising a control bar having notches intended to receive a rotating shaft, thus allowing the locking of the movable bar.

However, the control bar described in the document EP-A-1 040 753 is hollow. This certainly simplifies the storage of the basic materials, since a control bar is used having the same characteristics—and in particular the same diameter—as the longitudinal members.

On the other hand, the use of a hollow control bar presents many drawbacks.

First of all, a hollow bar has less strength than a solid bar. This gives rise to two major difficulties:
- firstly, it is necessary to increase the diameter of the bar in order to increase its rigidity, the bar being weakened by the presence of the notches. Thus a new control bar—provided with notches—cannot be easily adapted to head gates already installed, lengthy and expensive changes needing to be made:
- secondly, bearings must be placed in line with each of the notches, to absorb the forces. Additional parts are thus necessary, which gives rise to extra cost and less easy installation.

Equally, the production of a notch in a hollow bar gives rise to the formation of sharp surfaces. The result is increased wear on the sliding shaft, and potentially a greater noise when the sliding shaft drops into the notch.

Moreover, the control bar is traditionally produced from an oxidisable material, such as steel. Because of this, an additional galvanisation step is necessary. This operation is extremely expensive and constraining. In addition, it results in not insignificant deformations of the hollow control bar, which may give rise to poor adaptation of the notch to the sliding shaft, thus limiting the locking height. The locking of the movable bar is then not perfectly assured.

The purpose of the invention is to provide a head gate element provided with a device for locking the movable bar which is more secure and less expensive to manufacture.

The invention aims in particular to propose a stronger control bar, with no welds, and affording better locking of the slide.

To this end, the object of the invention is a head gate element comprising:
- a substantially flat frame;
- a substantially rectilinear movable bar mounted so as to pivot on a shaft fixed to the said frame and substantially perpendicular to the plane, so that the movable bar can be situated in two extreme inclined positions, namely an open position and a release position, as well as in an intermediate so-called closed position in which the movable bar is substantially vertical;
- fixed rigidly to one end of the movable bar, a locking fork joint formed by two plates, receiving a transverse slide able to move in translation in the direction of the movable bar;
- a control bar able to move in rotation about its longitudinal axis in order to control the possibilities of the movable bar in the aforementioned three positions, this control bar being fixed in translation to the top part of the frame and extending between the two plates of the locking fork joint.

According to a general definition of the invention, the control bar comprises locking means themselves comprising a transverse notch arranged so that the slide can fit therein when the movable bar and the control bar are in the closed position, and the control bar is solid.

The control bar being solid, it is possible to machine a transverse groove in this bar in order to form the said notch. It is thus no longer necessary to carry out welding, the control bar there being more simple and less expensive to manufacture.

The production of a notch in a solid bar does not create—or only slightly creates—sharp surfaces, which considerably reduces wear on the slide.

According to a first embodiment, the control bar can be produced from a strong lightweight metallic material, other than galvanised steel.

The metallic material employed is chosen so that the control bar thus produced is as strong as a hollow bar of the prior art, generally produced from steel, for an unchanged diameter. Because of this, it is possible to associate the control bar according to the invention with an existing head gate without any particular adaptation, and without using any additional part.

The material of the control bar is also lighter than steel, so that the solid bar obtained has a weight comparable with that of the hollow steel bars of the prior art.

The metal used is also chosen so as not to require any galvanisation operation, thus avoiding constraining operations such as in particular handling, the production of orifices on the bar enabling it to be attached and suspended before it is introduced into a galvanisation bath, finishing of the bar (removal of the zinc deposited in excess at the notch, etc).

Consequently the manufacture of the control bar is less lengthy and less expensive.

In addition, since the bar does not undergo any galvanisation, it does not undergo any deformation, and thus ensures perfect locking of the movable bar in the closed position.

The invention makes it possible to obtain a completed metal control bar.

Different metals can be used, for example copper, bronze or a non-oxidisable metal.

The control bar can also be produced from a metal belonging to the group formed by aluminium and alloys thereof.

It also has, with equal external dimensions, substantially the same weight as a hollow steel bar, and comparable strength.

Aluminium has the advantage of having a colour very close to galvanised steel used for the frame of the head gate element. Thus a head gate is obtained whose external appearance is very satisfactory.

In spite of the relatively high price of aluminium, the cost of manufacturing the control bar can be reduced by 10 to 15% by virtue of the invention, in particular because of the elimination of the galvanisation step.

According to a second embodiment, the control bar can comprise a metallic core and a plastic coating.

According to one embodiment, the locking means carried by the control bar also comprise an inclined flat on the control bar so as to form a slope, the bottom of the said slope opening out in the notch and the top of the said slope being oriented towards the open position of the movable bar so that the slide, when the movable bar passes from the open position to the closed position, can slide along the control bar and then along the slope and then fit in the notch.

This slope facilitates the locking of the movable bar by obliging the slide to fit in the notch.

This is because, when the movable bar is actuated and the slide is at the bottom of the slope, the said slide is then already partially engaged in the notch and, coming to abut against the side of the notch opposite to the flat, can only fit in.

The measures described up to now enable the control bar to be manufactured without welding whilst ensuring better locking of the slide.

It is also possible to ensure a precise translation of the slide by preventing unwanted release.

To this end, a head gate element of the type described above is provided, in which the slide is guided in translation by guidance means situated on the internal face of each of the plates of the locking fork joint.

The external faces of the locking fork joint are thus free of any projecting translation device, denying the animals the possibility of lifting the slide.

It will be observed that this arrangement can be used independently of the aforementioned device with notch.

In one embodiment, the guidance means comprise profiles situated on the internal face of each of the plates, the said profiles having their longitudinal axis substantially parallel to the longitudinal axis of the movable bar.

The use of these profiles makes it possible to obtain robust runners at a low production cost.

More precisely, two profiles are fixed to the internal face of each of the plates, the two profiles on the same plate being separated so that the slide can slide along this separation distance.

This type of guidance has sufficient precision for the application in question.

It is however possible to improve it by providing, on the slide, stops arranged so as to slide against the profiles, preventing the slide from coming into contact with the two plates, thus preventing its wedging during its translation movement.

In a particular embodiment, the slide comprises a metallic core and a polymer envelope.

The metallic core enables the slide to attain a weight ensuring correct functioning of the locking means and the polymer envelope makes it possible to obtain a covering with a low coefficient of friction in which it is also possible to form the previously described stops.

In one embodiment, the head gate element also comprises a safety locking device for the closed position of the movable bar, the said device consisting of a removable pin connecting, when it is in place, the locking fork joint and the frame.

The various embodiments can also advantageously encompass safety equipment vis-à-vis the animals.

In particular, the movable bar of the head gate element according to the invention can also comprise, towards its end part opposite to the locking fork joint, means forming a counterweight able to automatically return the movable bar into its open position when it is not being acted on.

This prevents injury to or strangulation of the animals since the head gate can go into the closed position only by means of a deliberate action by the user.

In a variant, a bar connects the said end of the movable bar to the means forming a counterweight so as to prevent the collars of the animals becoming attached to the movable bar.

In another embodiment, these means forming a counterweight extend in a plane parallel to the main plane of the head gate so that they also enable the passage between the bottom part of the movable bar and the frame to be blocked off, on the side which is not provided for the animal to insert his head therein.

Likewise, the movable bar can also comprise, close TO The locking fork joint, means of blocking the passage between the top part of the movable bar and the frame, also on the side which is not provided for the animal to insert its head therein.

By thus blocking the openings not designed for the passage of the head of the animal, risks of jamming are greatly reduced.

In another embodiment, means of controlling the rotation of the control bar are provided.

As a variant, it is also possible to provide an end of rotational travel member, as well as means of locking the control bar for angular position.

Other particularities and advantages of the invention will also emerge from the following description relating to the accompanying drawings, given by way of non-limiting examples:

FIG. 2 is a perspective view of a head gate composed of several head gate elements according to the invention;

FIG. 3 is a front view of a head gate element according to one embodiment of the invention;

Figure 1:
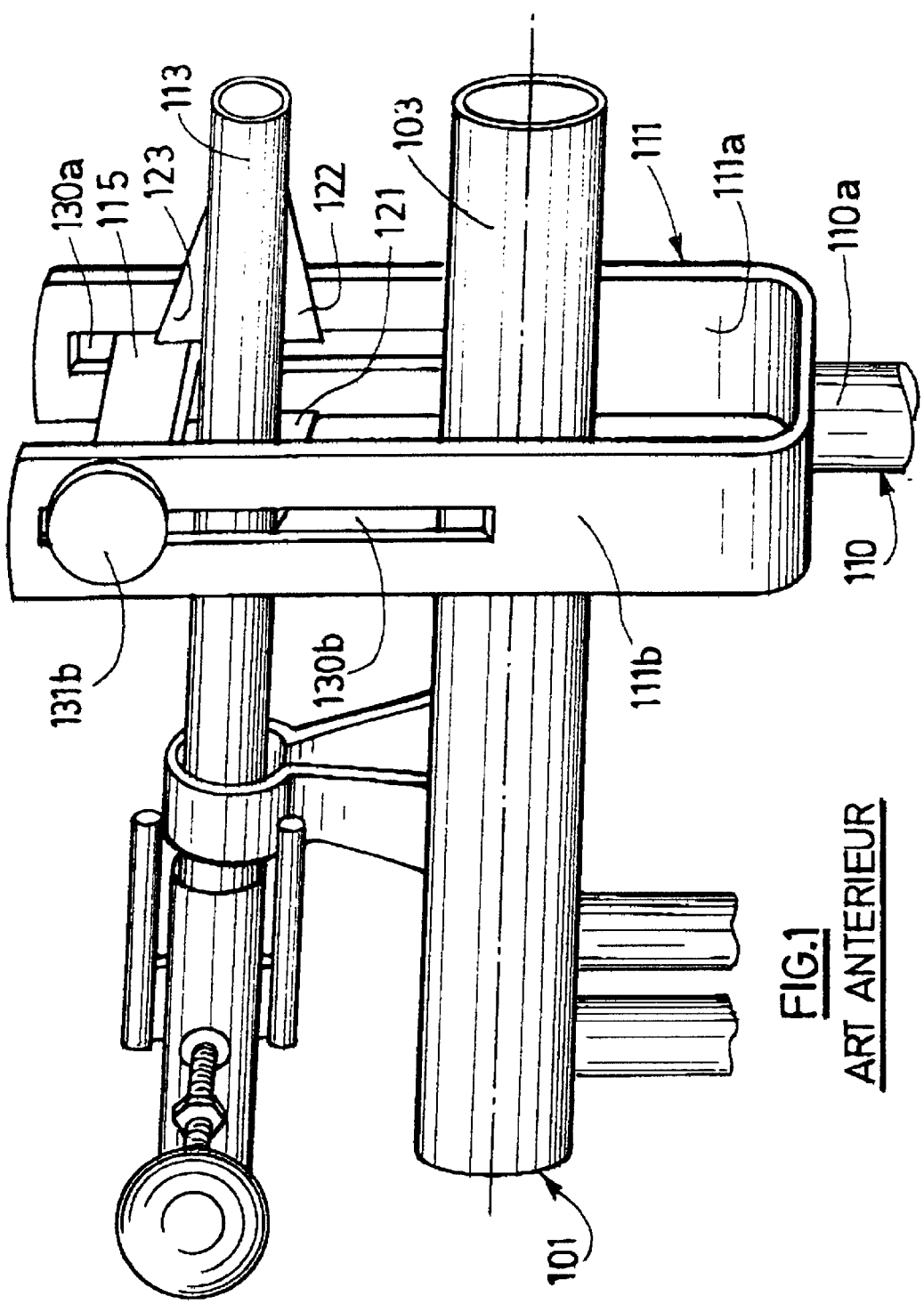
FIG. 1 is a partial view of a head gate element of the prior art described previously.

As depicted in FIG. 2, the frame 1 of the head gate element 2 comprises two substantially parallel longitudinal members 3a, 3b and two cross-members 4a, 4b substantially perpendicular to the longitudinal members 3a, 3b and connecting them together rigidly, the longitudinal members and cross-members lying in the same plane P.

The longitudinal members 3a, 3b and the cross-members 4a, 4b are hollow tubes, generally produced from steel, and galvanised.

An angled bar 5 is rigidly fixed to the frame 1, between the cross-members 4a, 4b and close to one of these cross-members 4a, the apex of the angle being oriented towards the other cross-member 4b and receiving a fork joint 8 intended to provide a pivot connection with the movable bar 10 on a pivot axis A substantially perpendicular to the plane P.

A control bar 13 is mounted on two bearings 6, 7 fixed to the top longitudinal member 3a so as to be substantially parallel to the said longitudinal member 3a and so as to be able to move in rotation on its own longitudinal axis. The bearings 6, 7 prevent the upward movement of the control bar 13, in particular caused by the animals, thus preventing accidents.

The control bar 13 is solid and produced from a strong lightweight material which does not require to be galvanised.

For example, the control bar 13 is produced from aluminium. In order to obtain a strength and weight comparable to those of a hollow steel bar traditionally used, it is possible to choose an aluminium control bar with the same diameter as the steel bar previously used. The diameter of the control bar is less than the diameter of the longitudinal member 3a.

Thus it is possible to mount a solid aluminium control bar 13 on existing head gates, provided with a hollow steel control bar, without it being necessary to change the bearings 6, 7.

The aluminium bar does not require any additional operation such as galvanising or painting, and can be directly fitted on a head gate. Its weight is around 14 kg, as opposed to a weight of 12 kg for a hollow steel bar.

Figure 4:
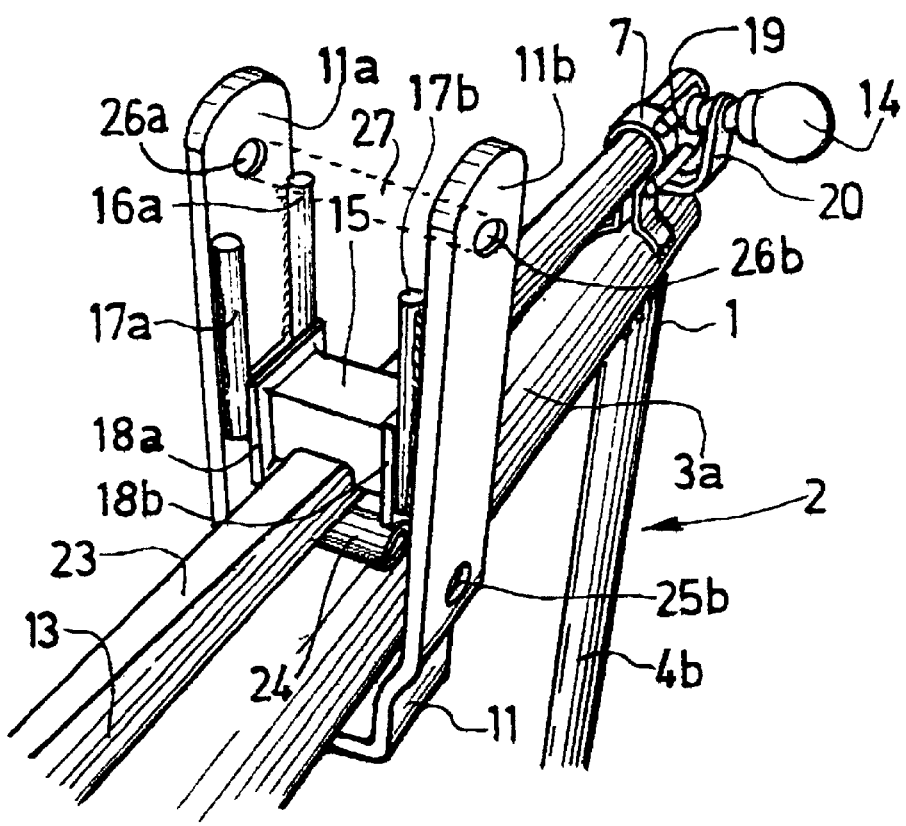
FIG. 4 is a partial perspective view of the top part of a head gate element according to one embodiment of the invention, the movable bar being in the closed position.

As shown in FIGS. 2 to 4, a locking fork joint 11 is rigidly fixed to the movable bar 10, at its end 10a close to the control bar 13, the said fork joint 11 comprising two substantially parallel plates 11a, 11b extending in the longitudinal direction of is the movable bar 10 and arranged so as to straddle the top longitudinal member 3a and the control bar 13.

FIG. 4 shows that means 16a, 17a, 16b, 17b of guiding in translation are situated on the internal face of each of the plates 11a, 11b.

This is because, on the internal face of each of the plates 11a, 11b, there are welded side by side two profiles 16a, 17a; 16b, 17b, for example cylindrical and parallel, extending on axes substantially parallel to the longitudinal direction of the movable bar 10.

A slide 15 is arranged so as to be inserted in the locking fork joint 11, between the two plates 11a, 11b and, at each plate, between each pair of cylindrical profiles 16a, 17a; 16b, 17b.

Figure 7:
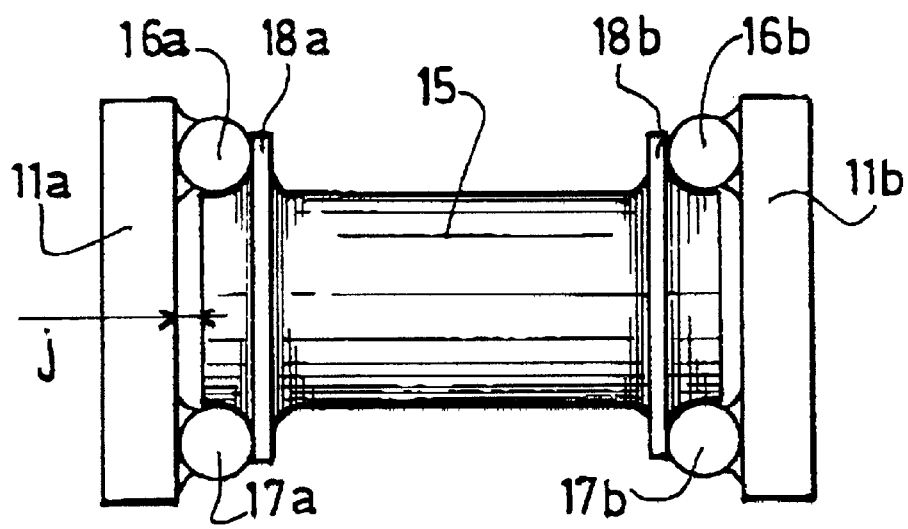
FIG. 7 is a plan view of the movable bar, in the direction of the longitudinal axis of the said bar.

On each internal face of the plates 11a, 11b, the separation between the two profiles 16a, 17a; 16b, 17b enables the slide 15 to slide along this separation distance, as can be seen in FIG. 7.

The slide 15 is described in more detail with reference to FIGS. 7 to 9.

The slide 15 comprises a metallic core 30 and a hollow polymer envelope 31 intended to receive the said core 30. This structure in two parts produced from different materials makes it possible to be free of thermal constraints and to use the slide 15 at very different temperatures. The slide 15 also comprises a closure element 32.

The metallic core 30 confers on the slide 15 sufficient weight to ensure that it drops between the plates 11a, 11b and allows locking of the movable bar 10 in the closed position, as will be seen below. The metallic core 30 is for example substantially parallelepipedal, this shape, adapted to the internal shape of the envelope 31, making it possible to obtain better locking of the movable bar 10.

The envelope 31 is produced from a polymer with a low coefficient of friction, in order to ensure good sliding of the slide 15 along the profiles 16a, 17a; 16b, 17b.

The envelope 31 comprises a hollow parallelepipedal central part 33 provided on its internal face 34 with projections 35 extending longitudinally. The projections 35 reinforce the slide 15 but also limit stresses due to temperature.

The envelope 31 also comprises, towards its end parts, flat walls forming stops 18a, 18b.

Figure 8:
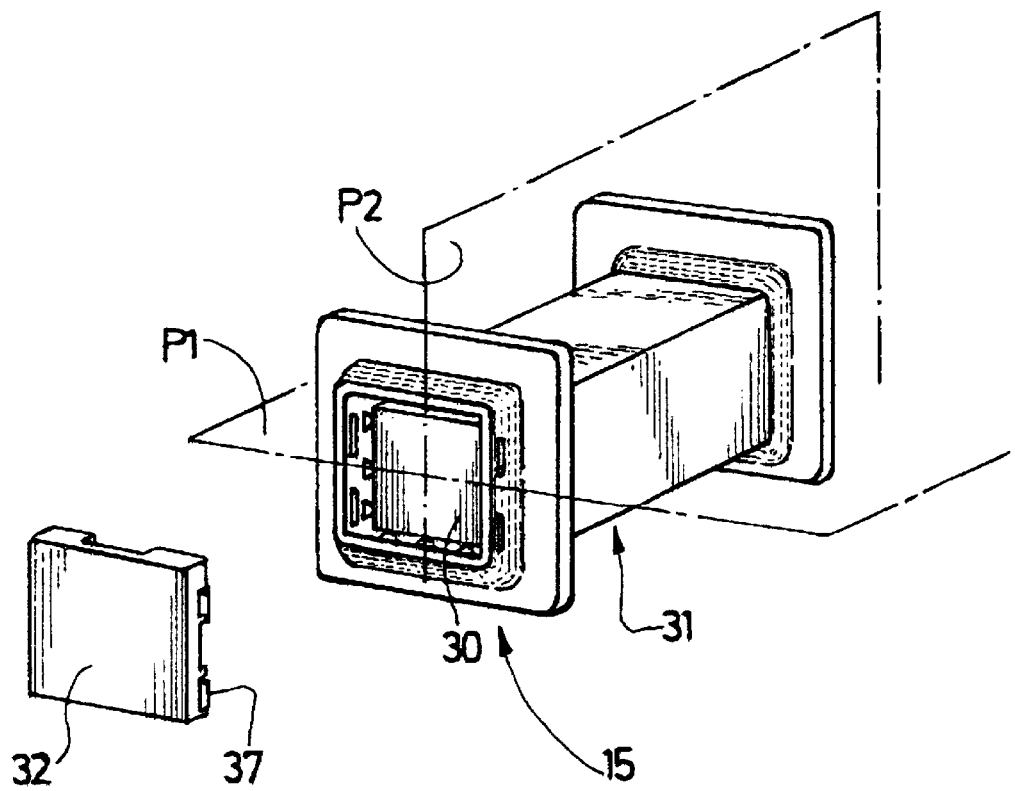
FIG. 8 is a perspective view of an embodiment of the slide, comprising a metallic core and an envelope, as well as a closure element which has been removed.
Figure 9:
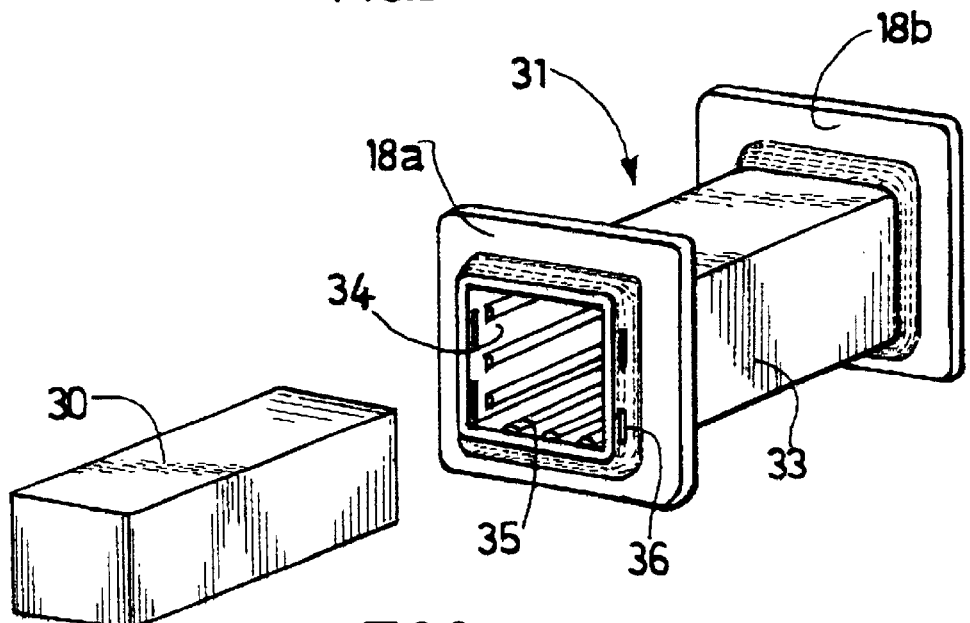
FIG. 9 is a view similar to that of FIG. 8, the metallic core being separated from the envelope of the slide, the closure element not being shown.

The slide 15 has two longitudinal planes of symmetry P1, P2, substantially perpendicular to each other, as illustrated in FIG. 8.

Finally, the envelope 31 comprises at one of its ends orifices 36 intended for fixing the closure element 32, which has complementary lugs 37. One possible implementation of the slide 15 consists of introducing the metallic core 30 into the envelope 31 and then associating the closure element 32 with the said envelope 31 by snapping on.

The stops 18a, 18b are arranged to slide against the cylindrical profiles 16a, 17a, 16b, 17b whilst preventing the slide 15 from coming into contact with the two plates 11a, 11b, thus preventing its wedging during its translation movement. A clearance j is thus provided between each end of the slide 15 and the internal face of the plates 11a, 11b, as shown in FIG. 7.

On the control bar 13, substantially at its middle, there is machined a notch 9 having a shape enabling the slide 15 to fit therein—for example a substantially parallelepipedal shape. The notch 9 is for example produced by means of a press, the control bar 15 being thus pressed in one very simple and rapid operation. The tool forming the notch is moved perpendicular to the control bar 13, substantially parallel to the bottom of the notch 9.

In the open position O, the slide 15 rests, through the effect of its own weight, on the control bar 13.

Thus, when the movable bar 10 passes from the open position O to the closed position F, the user can manually actuate the said movable bar 10, the slice 15 sliding along the control bar 13 until it encounters the notch 9 and fits therein. The passage from the open position O to the closed position F can also take place without the intervention of the user, by simple movement of the animals moving their head downwards in order to feed from a receptacle placed at the foot of the head gate for this purpose.

The position of the notch 9 on the length of the control bar 13 therefore determines the closed position F.

Although the control bar 13 does not have sharp edges at the notch 9, the repetition of the pivoting movement of the movable bar, and the contact between the slide 15 and the notch 9, results in wear on the envelope 31 of the slide 15. The metallic core 30 may then be visible and generate a large amount of noise when it slides on the control bar 13.

The existence of the two planes of symmetry P1, P2 also considerably increases the service life of the slide 15 since the slide 15 can be turned on itself, about its longitudinal axis, by quarters of a turn, so as to turn towards the control bar 13 a non-worn face of the central part 33 of the envelope 31 of the slide 15, and this without modifying the functioning of the head gate.

The fact that the control bar 13 is able to move in rotation on its longitudinal axis enables it to adopt at least two angular positions: a first angular position (see FIGS. 3 and 4) in which the notch 9 is turned towards the slide 15 when the latter is closed, thus enabling it to fit in, and a second angular position (see FIG. 5) in which the notch 9 is retracted from the path of the slide 9 on the control bar 13, the movable bar 10 thus being able to be moved between the open position O and the release position D without being locked.

Means of controlling in rotation, for example a handle 14 fixed to the control bar 13, enables the user to place the said bar in the required angular position. Nevertheless, an end of rotational travel member 19 limits the rotation of the control bar to the required angular sector.

Means 20 of locking the angular position of the control bar 13 are also provided.

Moreover, the rotation of the control bar 13 enables the movable bar 10 to be released when the latter is in the closed position F with the slide 15 fitted in the notch.

This is because, when the control bar 13 is rotated and passes from the first angular position to the second angular position, the notch 9 is released from the slide 15.

In addition, the invention provides means for preventing the upward translational movement of the slide 15, outside the plates 11a, 11b. This can in particular occur when animals cause impacts in the head gate. These means, illustrated in FIG. 4, comprise orifices 26a, 26b formed in the plates 11a, 11b, towards their top end, and a hollow cylindrical strut 27 (shown in dotted lines) intended to be placed substantially horizontally, perpendicular to the plates 11a, 11b, in correspondence with the orifices 26a, 26b. The fixing of the strut 27 to the fork joint 11 takes place by means of screws—not shown—once the slide 15 has been inserted between the cylindrical profile 16a, 17a, 16b, 17b.

FIGS. 2 and 3 show that the movable bar 10 also comprises, towards its end part 10b opposite to the locking fork joint, means 12 forming a counterweight able to automatically return to the movable bar 10 into its open position O when it is not being acted on.

These means forming a counterweight can be a metal sheet 12 welded to the bottom part of the movable bar 10 and extending in a plane parallel to the plane P, in the direction of the angled bar 5, in order to block the passage between the bottom part of the movable bar 10 and the cross-member 4a situated on the angled bar 5 side.

The purpose of the blocking of this passage is to prevent the animal from putting his head therein, thus preventing injury.

Likewise, also visible in FIG. 3, the movable bar 10 also comprises, towards its top part 10a, close to the locking fork joint 11, means 21 of blocking the passage between the movable bar 10 and the cross-member 48 situated on the angled bar 5 side.

The animals must also be protected against their collars being hooked on the bottom end 10b of the movable bar 10. For this purpose, a welded bar 22 connects the said end of the movable bar 10 to the metal sheet 12 forming a counterweight (see FIG. 3).

Figure 5:
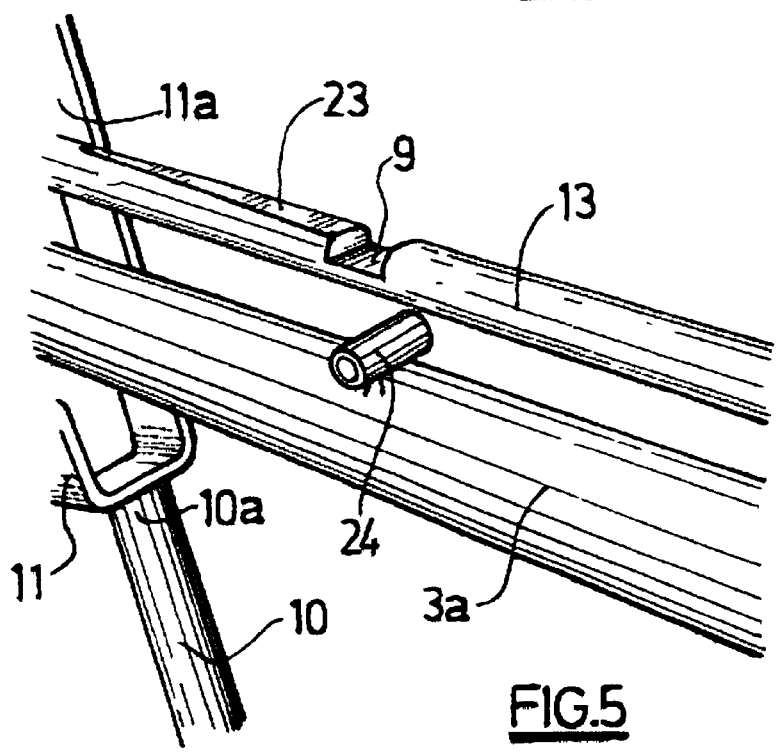
FIG. 5 is a partial perspective view of the head gate element of FIG. 4, the movable bar being in the open position.
Figure 6:
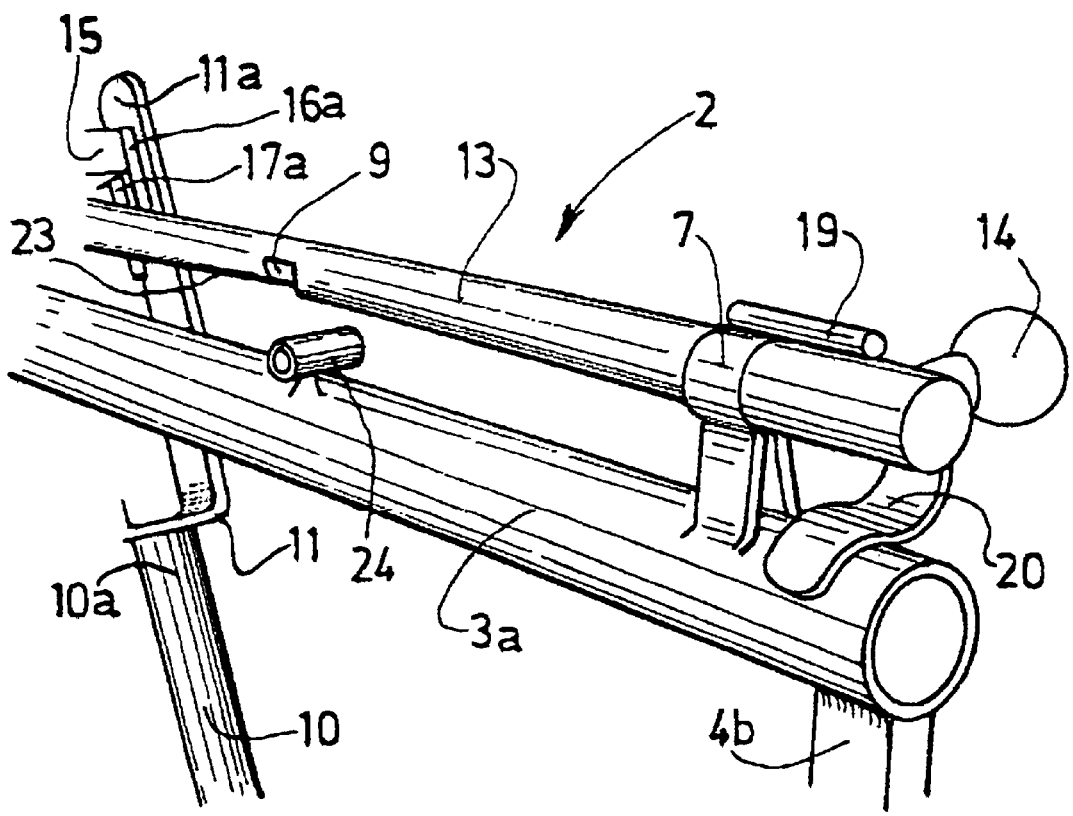
FIG. 6 is a partial perspective view of the head gate element of FIG. 4, the movable bar being in the open position and the control bar being in an angular position according to which the notch is retracted from the path of the slide.

As shown by FIGS. 4 and 5 and in order to improve the fitting of the slide 15 in the notch 9, an inclined flat 23 is provided on the control bar 13 so as to form a slope, the bottom of the said slope 23 opening out in the notch 9 and the top of the said slope 23 being oriented towards the open position O of the movable bar 10 so that the slide 15 when the movable bar 10 passes from the open position O to the closed position F, slides along the control bar 13 and then along the slope 23 and then fits in the notch 9. The flat can also be produced by means of a press.

In the present embodiment and following tests, the following values were adopted in order to ensure correct functioning of the locking of the movable bar 10:

distance between the two internal faces of the plates 11a, 11b: 80 mm length of slide 15: 74 mm space between the cylindrical profiles 16a, 17a; 16b, 17b on one and the same internal face of the plates 11a, 11b: 31 mm width of the slide 15: 30 mm weight of the slide 15: 300 g to 350 g diameter of the control bar 13: 28 mm width of the notch 9 (in the longitudinal direction of the control bar 13): 30.5 mm depth of the notch 9 (in the radial direction of the control bar 13): 14 mm (the bar 13 is machined as far as its mid-diameter)

length of the slope 23 (in the longitudinal direction of the control bar 13): 150 mm difference in level of the slope 23: 4 mm.

The head gate element according to the invention can also comprise a device for the safety locking of the closed position F in the movable bar 10, clearly visible in FIGS. 4 and 5, the said device comprising a removable pin (not shown) introduced into a sleeve 24 fixed to the frame 1 and in the holes 25a, 25b formed in the plates 11a, 11b, the said pin, when it is in place, connecting the locking fork joint 11 and the frame 1.

What is claimed is:

1. A head gate element comprising:
    a substantially flat frame;
    a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;
    fixed rigidly to one end of the movable bar, a locking fork joint formed by two plates, receiving a transverse slide having a metallic core of a predetermined weight adequate to reliably move the slide in translation in the direction of the movable bar;
    a control bar able to move in rotation about its longitudinal axis in order to control the possibilities of the movable bar in said three positions, said control bar being fixed in translation to the top part of the frame and extending between the two plates of the locking fork joint;
    the control bar comprising locking means including a transverse notch arranged so that the slide can fit therein when the movable bar and the control bar are in the closed position, characterized in that the control bar is solid.

2. A head gate element according to claim 1, characterised in that the control bar is produced from a strong lightweight metallic material, other than galvanised steel.

3. A head gate element according to claim 1, characterised in that the control bar is produced from a material belonging to the group formed by aluminum and its alloys, copper and bronze.

4. A head gate element according to claim 1, characterised in that the top part of the frame is a hollow cylindrical longitudinal member with a diameter greater than the diameter of the control bar.

5. A head gate element according to claim 1, characterized in that the locking means carried by the control bar include an inclined flat on the control bar so as to form a slope, the bottom of said slope opening out in the notch and the top of the said slope being oriented towards the open position of the movable bar so that the slide, when the movable bar passes from the open position to the closed position, can slide along the control bar, then along the slope and then fit in the notch.

6. A head gate element according to claim 1, characterised in that it also comprises means of controlling the rotation of the control bar.

7. A head gate element according to claim 1, characterised in that it also comprises an end of rotational travel member for the control bar.

8. A head gate element according to claim 1, characterised in that it also comprises means for locking the angular position of the control bar.

9. A head gate element comprising:
    a substantially flat frame;
    a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;
    fixed rigidly to one end of the movable bar, a locking fork joint formed by two plates, receiving a transverse slide able to move in translation in the direction of the movable bar;
    a control bar able to move in rotation about its longitudinal axis in order to control the possibilities of the movable bar in said three positions, said control bar being fixed in translation to the top part of the frame and extending between the two plates of the locking fork joint;
    the control bar comprising locking means including a transverse notch arranged so that the slide can fit therein when the movable bar and the control bar are in the closed position, characterized in that the control bar is solid;
    further characterised in that the control bar comprises a metallic core and a plastic covering.

10. A head gate element comprising:
    a substantially flat frame;
    a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;
    fixed rigidly to one end of the movable bar, a locking fork joint formed by two plates, receiving a transverse slide able to move in translation in the direction of the movable bar;
    a control bar able to move in rotation about its longitudinal axis in order to control the possibilities of the movable bar in said three positions, said control bar being fixed in translation to the top part of the frame and extending between the two plates of the locking fork joint;
    the control bar comprising locking means including a transverse notch arranged so that the slide can fit therein when the movable bar and the control bar are in the closed position, characterized in that the control bar is solid;
    further characterised in that the slide comprises a metallic core and a polymer envelope.

11. A head gate element comprising:
    a substantially flat frame;
    a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;
    fixed rigidly to one end of the movable bar, a locking fork joint formed by two plates, receiving a transverse slide able to move in translation in the direction of the movable bar;
    a control bar able to move in rotation about its longitudinal axis in order to control the possibilities of the movable bar in said three positions, said control bar being fixed in translation to the top part of the frame and extending between the two plates of the locking fork joint;
    the control bar comprising locking means including a transverse notch arranged so that the slide can fit therein when the movable bar and the control bar are in the closed position, characterized in that the control bar is solid;
    further characterised in that the slide is guided in translation by guidance means situated on the internal face of each of the plates.

12. A head gate element according to claim 11, characterised in that said guidance means comprise profiles situated on the internal face of each of the plates, the said profiles having their longitudinal axis substantially parallel to the longitudinal axis of the movable bar.

13. A head gate element according to claim 12, characterised in that two profiles are fixed to the internal face of each of the plates, the two profiles on the same plate being separated so that the slide can slide along this separation distance.

14. A head gate element according to claim 12, characterised in that the slide also comprises stops arranged so as to slide against the profiles whilst preventing the slide from coming into contact with the two plates, thus preventing their being wedged during its translation movement.

15. A head gate element comprising:

a substantially flat frame;

a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;

fixed rigidly to one end of the movable bar, a locking fork joint formed by two plates, receiving a transverse slide able to move in translation in the direction of the movable bar;

a control bar able to move in rotation about its longitudinal axis in order to control the possibilities of the movable bar in said three positions, said control bar being fixed in translation to the top part of the frame and extending between the two plates of the locking fork joint;

the control bar comprising locking means including a transverse notch arranged so that the slide can fit therein when the movable bar and the control bar are in the closed position, characterized in that the control bar is solid;

further characterised in that it also comprises a safety locking device for the closed position of the movable bar, said device consisting of a removable pin connecting, when it is in place, the locking fork joint and the frame.

16. A head gate element comprising:

a substantially flat frame;

a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;

fixed rigidly to one end of the movable bar, a locking fork joint formed by two plates, receiving a transverse slide able to move in translation in the direction of the movable bar;

a control bar able to move in rotation about its longitudinal axis in order to control the possibilities of the movable bar in said three positions, said control bar being fixed in translation to the top part of the frame and extending between the two plates of the locking fork joint;

the control bar comprising locking means including a transverse notch arranged so that the slide can fit therein when the movable bar and the control bar are in the closed position, characterized in that the control bar is solid;

further characterised in that the movable bar also comprises, towards its external part opposite to the locking fork joint, means forming a counterweight able to automatically return the movable bar into its open position when it is not being acted on.

17. A head gate element according to claim 16, characterised in that a bar connects said end of the movable bar to the means forming a counterweight.

18. A head gate element according to claim 16, characterised in that the means forming a counterweight extend in a plane parallel to the plane so that they also block the passage between the bottom part of the movable bar and the frame.

19. A head gate element comprising:

a substantially flat frame;

a substantially rectilinear movable bar mounted so as to pivot on a shaft fixed to said frame and substantially perpendicular to the plane, so that the movable bar can be situated in two extreme inclined positions, namely an open position and a release position, as well as in an intermediate closed position in which the movable bar is substantially vertical;

fixed rigidly to one end of the movable bar, a locking fork joint formed by two plates, receiving a transverse slide able to move in translation in the direction of the movable bar;

a control bar able to move in rotation about its longitudinal axis in order to control the possibilities of the movable bar in said three positions, said control bar being fixed in translation to the top part of the frame and extending between the two plates of the locking fork joint;

the control bar comprising locking means including a transverse notch arranged so that the slide can fit therein when the movable bar and the control bar are in the closed position, characterized in that the control bar is solid;

further characterised in that the movable bar also comprises, close to the locking fork joint, means of blocking the passage between the top part of the movable bar and the frame.

* * * * *